March 19, 1935. F. FERRIN 1,994,815
RAILROAD AND LAND VEHICLE TRAILER TRUCK AND TRANSFER SYSTEM
Filed July 18, 1932 2 Sheets-Sheet 1
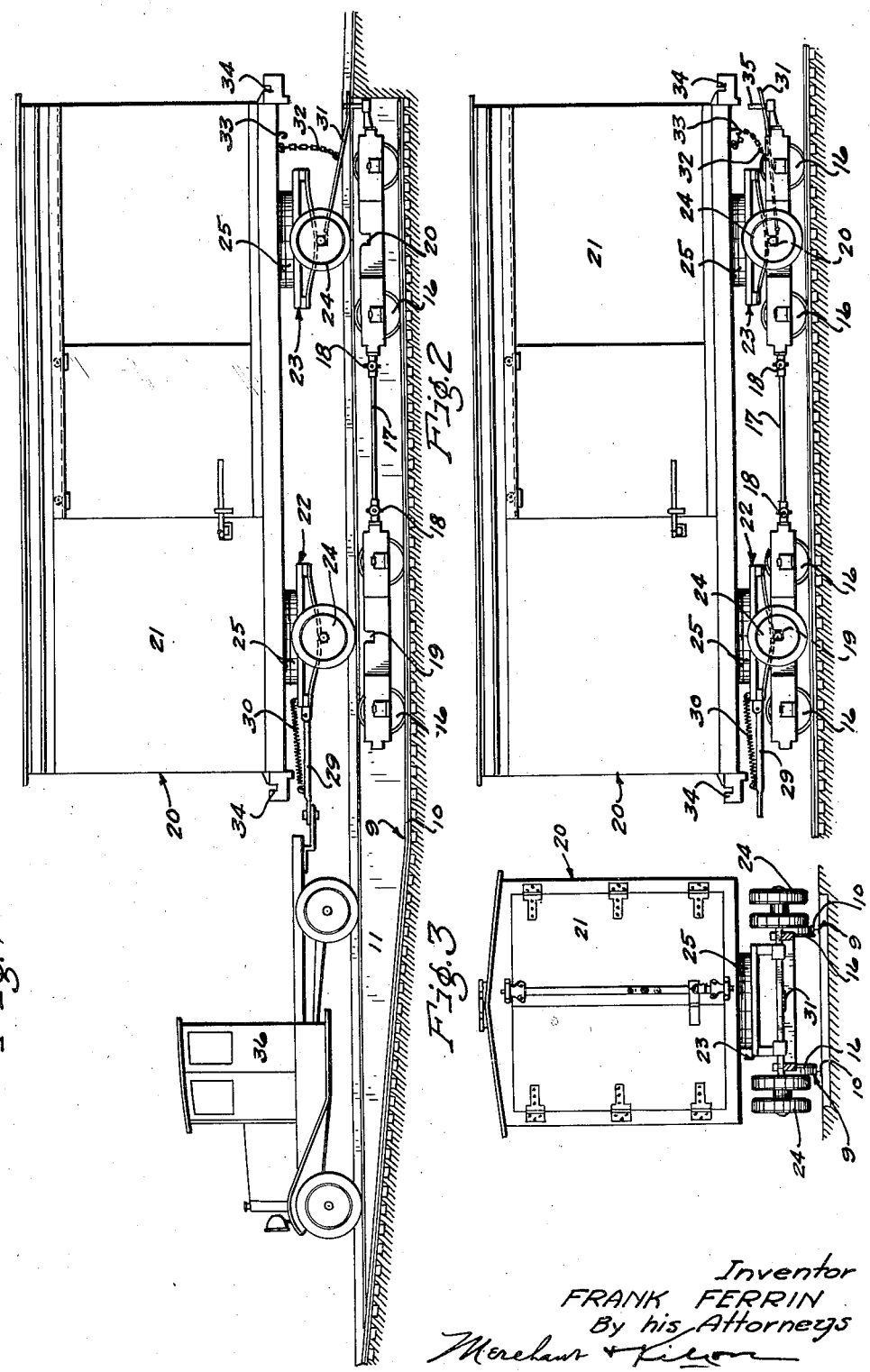
Inventor
FRANK FERRIN
By his Attorneys March 19, 1935.  F. FERRIN  1,994,815
RAILROAD AND LAND VEHICLE TRAILER TRUCK AND TRANSFER SYSTEM
Filed July 18, 1932   2 Sheets-Sheet 2
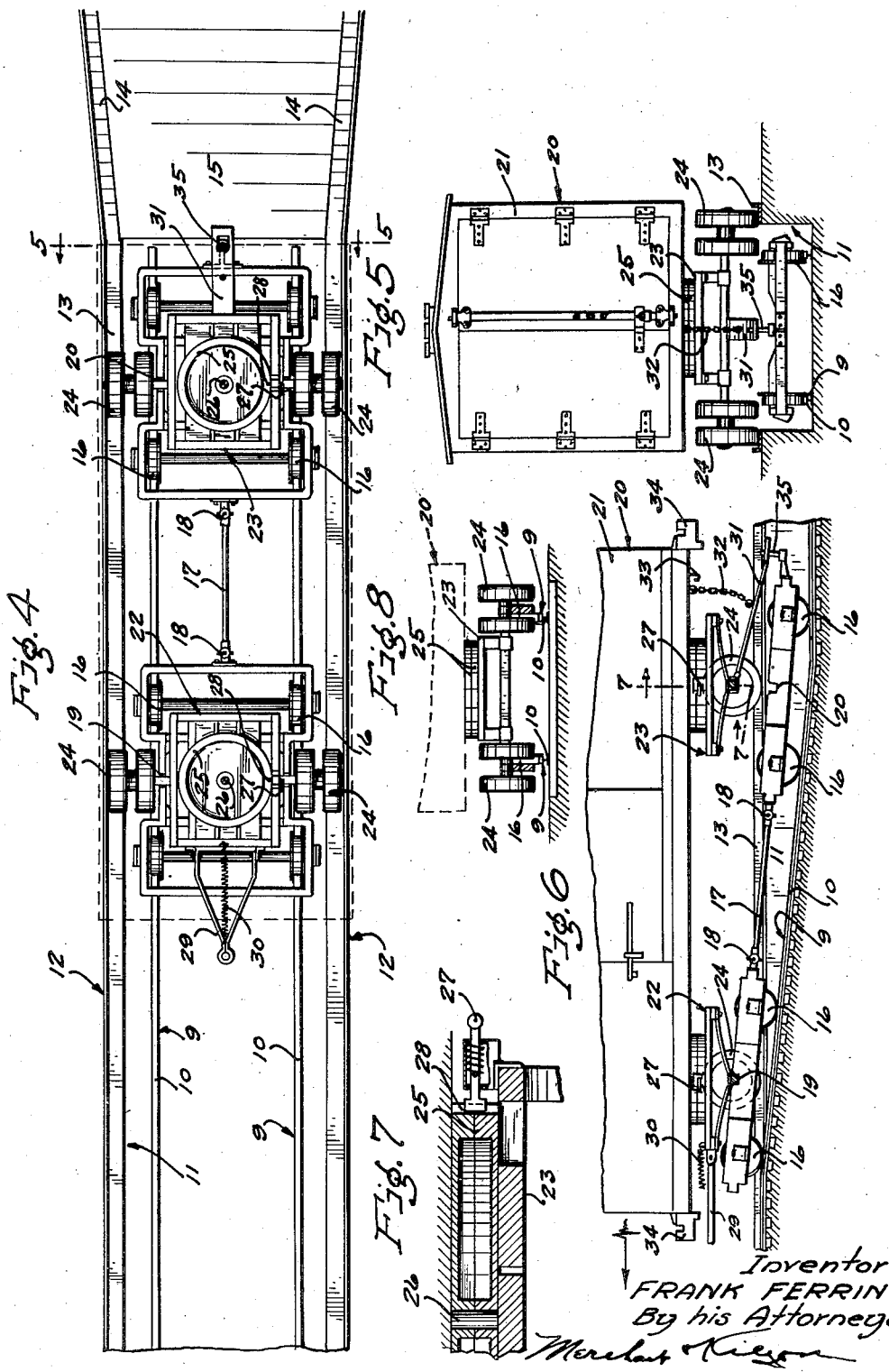
Inventor
FRANK FERRIN
By his Attorneys Patented Mar. 19, 1935

1,994,815

UNITED STATES PATENT OFFICE 1,994,815

RAILROAD AND LAND VEHICLE TRAILER TRUCK AND TRANSFER SYSTEM

Frank Ferrin, Minneapolis, Minn.

Application July 18, 1932, Serial No. 623,092

9 Claims. (Cl. 105—215)

My invention has for its object the provision of a simple and highly efficient railway and land vehicle trailer truck and transfer system.

By the use of this system merchandise, live stock, and the like may be loaded at a factory, mine, farm or other receiving point and drawn by a tractor over a highway to the nearest railroad receiving point. From here the trailer is automatically mounted on railway trucks, of any suitable type, by the motive power of the tractor, made up in a train and drawn by a locomotive to the nearest point on the railroad to its destination. At this point, the trailer is taken out of the train, the railway trucks automatically removed therefrom, and another tractor used to remove the trailer from the siding and draw the same over a highway to its destination, where the trailer is unloaded. It will thus be seen that after a shipment is once loaded, it does not have to be handled again until it is unloaded at its destination.

As is well known, it is now necessary, when shipping by rail, to first load the shipment on a truck by which it is conveyed to the nearest receiving point on a railway, and then unload and load the same in a car. At the end of the run, the shipment must be unloaded from the car and loaded into a truck by which the shipment is conveyed to its destination. Obviously, by the use of my improved system, a large amount of work will be eliminated in the handling of a shipment, and hence the danger of damaging the same is greatly reduced. The body of the improved trailer may be of the same design as the present railway box cars, flat cars, refrigerator cars, stock cars and the like.

To the above end, generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings—

Fig. 1 is a view partly in longitudinal vertical section and partly in side elevation, showing the trailer truck just after the same has been automatically coupled to a pair of railway trucks in the process of being mounted thereon under the motive power of a tractor;

Fig. 2 is a side elevation of the tractor trailer after being mounted on the railway truck to be transported thereby;

Fig. 3 is an end elevation of the parts shown in Fig. 2;

Fig. 4 is a plan view of the parts shown in Fig. 1, with the body of the trailer removed from its trucks for the purpose of better illustrating the underlying parts;

Fig. 5 is a view principally in end elevation with some parts sectioned on the line 5—5 of Fig. 4;

Fig. 6 is a view corresponding to Fig. 1, but showing a further step in the process of mounting the trailer on the railway trucks and in which step the front truck of the trailer has been automatically connected to the front railway truck;

Fig. 7 is a fragmentary detail view with some parts sectioned on the line 7—7 of Fig. 6, on an enlarged scale; and Fig. 8 is a view corresponding to Fig. 3, with the exception that the body of the trailer is only fragmentarily illustrated by means of broken lines, and illustrates a slight modification in the railway trucks.

The numeral 9 indicates the outer end portion of a railway side track which leads to and from a main railway track, not shown. The rails 10 of this portion of the side track 9 are laid in a pit 11 and lead to and from said pit on an incline. Above the pit 11 is a track section 12 for a tractor and trailer truck, and the guide rails 13 thereof have upstanding flanges at their outer longitudinal edges. These guide rails 13 have a much wider gauge than the rails 10 but have the same centers and are laid close to the sides of the pit 11. The guide rails 13, at the rear end of the pit 11, have receiving sections 14 that are in diverging relation, for the purpose of guiding a tractor and trailer truck onto the main sections of the guide rails 13. Between the guide rail sections 14 is a platform or apron 15 on which a vehicle may run when entering between said sections. It may be here stated that the space forward of the pit 11 between the rails 10 and on each side thereof is paved so that a tractor or other vehicle may freely run over said rails.

To equip a trailer with car trucks so that the same may be made up in a train of trailers or cars to be drawn by a locomotive, a pair of four-wheel railway trucks 16 are run into the pit 11. The trucks 16 are connected by a reach 17, the end portions of which have universal joints 18 to permit the required relative movement of said trucks. In the side frames of each railway truck 16 is a pair of transversely aligned open seats 19, for a purpose that will presently appear. When the railway trucks 16 are in the pit 11, a tractor and trailer truck may freely pass thereover.

Referring now in detail to the improved trailer truck 20, the same, as shown, has a body 21 of the box car type but may be of any other type. This body 21 is mounted on front and rear trucks 22 and 23 having tire-equipped dual wheels 24. Each truck 22 and 23 is attached to the trailer body 21 by a large center bearing 25 comprising upper and lower annular plates, the former of which is fixed to said body and the latter of which is fixed to the respective truck, and which plates are connected by a king bolt 26, see Fig. 7.

To lock either truck 22 or 23 against pivotal movement and for straight-line travel only, there is provided a spring-projected latch bolt 27 and co-operating lock notches 28 in the two center bearing plates. Said lock bolt 27 is mounted in a bracket on the respective truck and projects radially from the king bolt 26. By retracting the lock bolt 27 and turning the same about its longitudinal axis 180 degrees, in which it extends transversely of the lock notches 28, it will be held in an inoperative position by its engagement with the peripheries of the center bearing plates.

A drawbar 29 for attaching the trailer truck to a tractor is pivoted to the truck 22 for vertical swinging movement and is normally held raised by a coiled spring 30 anchored at one end to said truck and attached at its other end to the drawbar 29. Hingedly secured to the truck 23 for vertical swinging movement is the drawbar 31 of an automotive coupler. In the outer end of the drawbar 31 is an aperture for the lock pin of a coupler, as will presently appear. A chain 32 anchored to the trailer 20 and attached to the drawbar 31 is provided to limit the downward movement of said drawbar. On the under side of the trailer 20 is a hook 33 for holding the drawbar 31 raised and with which hook said drawbar may be interlocked by a slight edgewise angular movement from its hinge connection.

On each end of the trailer 21 is a hinged car coupler 34. The trailer body 21 and the car trucks 16 will be equipped with standard air brakes, but for the purpose of this case, it will not be necessary to illustrate the same.

The pin of the automatic coupler heretofore referred to, is, as shown, fixed on the rear end of the rear car truck 16 in an upstanding position and indicated by the numeral 35.

The seats 19 are designed to receive the axles of the trucks 22 and 23 and support the trailer truck 20 on the side frames of the car trucks 16. During the travel of the trailer truck 20 over the pit 11, the drawbar 31 which, at this time, is released from its holding hook 33, drags over the platform 15 and the top of the coupling pin 35 which projects above said platform. The engagement of the drawbar 31 with the top of the pin 35 raises said bar above the platform 15 so that when its aperture is brought into registration with the coupling pin 35, it will drop over said pin and thereby automatically couple the trailer truck 20 to the car trucks 16.

A tractor 36 is used for drawing the trailer truck 20 over a highway to a railway and onto the guide rails 13 where the same is automatically coupled to the car trucks 16 in the pit 11 to cause said trucks 16 to move with the trailer truck 20 while said trailer truck is being mounted on the car trucks 16 during their travel out of the pit 11 on the inclined section of the track 9, and the tractor is also used to remove the trailer truck 20 from the guide rails 13 after the car trucks 16 have been removed therefrom, and drawing the same over a highway from the railway.

When the trailer truck 20 is being drawn by the tractor 36, as shown in Fig. 1, the latch bolt 27 of the front truck 22 is held in an inoperative position to permit free steering action of said truck and the rear truck 23 is held by its latch bolt 27 against pivotal movement. If at any time it is necessary or desirable to draw the trailer truck 20 backwards, the tractor 36 may be attached thereto by the drawbar 31 and at which time the rear truck 23 will be released for free steering movement and the front truck 22 held against pivotal movement.

During the travel of the trailer truck 20 over the pit 11, it is supported entirely by its outer wheels 24, which run on the guide rails 13, and at which time the inner wheels 24 are unsupported and free to enter the inset portions of the side frames of the car trucks 16 during the mounting of the trailer truck 20 thereon, see Figs. 4 and 5.

From the above description it is evident that the trailer 20 after being loaded and drawn by the tractor 36 to a railway, is also drawn by said tractor onto the guide rails 13 from the rear of the pit 11. During the travel of the trailer truck 20 on the guide rails 13, it is automatically coupled to the car trucks 16 in the pit 11 and said trucks 16 moved therewith. As the car trucks 16 travel upward on the inclined portions of the track sections 9 which is in converging relation to the guide rails 13, they are gradually elevated under the trailer trucks 22 and 23 which causes the axles of said trucks 22 and 23 to enter the seats 19 and thereby interlock the car trucks 16 to the trailer trucks 22 and 23 and hold the trailer truck 20 and the car trucks 16 against relative longitudinal movement. During this lifting movement of the car trucks 16, the inner wheels 24 enter the inset portions of the side frames of the car trucks 16.

Obviously, the inner wheels 24, which are outward of the side frames of the car trucks 16, hold the trailer truck 20 against lateral shifting movement on the car trucks 16. Further lifting movement of the car trucks 16 will cause the side frames of car trucks 16 to engage the axles of the trucks 22 and 23, and thereby bodily lift the trailer truck 20 until its wheels 24 are out of engagement with the guide rails 13, and the trailer truck 20, supported entirely on the car trucks 16. After the car trucks 16 are completely out of the pit 11, the tractor 36 is detached from the drawbar 29 which leaves the trailer truck 20 free to be coupled in a train to be drawn by a locomotive on the main line.

When the trailer truck 20 has reached its destination, the same is taken out of the train and run onto a side track similar to the track section 9 and as the car trucks 16 enter the pit 11, they gradually lower the trailer truck 20 until its outer wheels 24 rest on the guide rails 13. At this time, a tractor may be backed onto the guide rails 13 from the rear end of the pit 11 and coupled to the trailer truck 20 by means of either the drawbar 29 or the coupling bar 31. Further movement of the trailer truck 20 over the pit 11 by the motive power of the tractor 36 will cause the car trucks 16 to move downward into the pit 11 and thereby automatically detach themselves from the trailer truck 20. After the removal of the trailer truck 20 from its car trucks 16, the same is drawn to its destination by the attached tractor.

In the structure shown in Fig. 8, the side frame of the car trucks 16 are constructed and arranged to pass longitudinally between the wheels of each pair with their seats 19 positioned to interlock with the parts of the car trucks between the wheels of said pairs and thereby support the trailer truck 20 therefrom.

It will of course be understood that in place of running the side track into a pit, the same may be on grade and the guide rails 13 elevated with an inclined section leading thereto.

What I claim is:

1. The combination with the two rails of a railway track, of a trailer truck, a track section for the trailer truck at an elevation above the railway track and including a pair of guide rails for the wheels of the trailer, said guide rails being of a wider gauge than the rails of the railway track and located one on each side thereof, the guide rails at one end of the track section being in converging relation with the rails of the railway track, a railway truck arranged to run on the rails of the railway track, said guide rails being arranged to support the trailer for movement over the railway truck when under the track section, and an automatic coupler for connecting the railway truck to the trailer when said trailer is over the railway truck during relative movement of the trailer on the guide rails and causing the railway truck to move therewith, whereby when the trailer and railway truck are moving on the converging portions of the two tracks, the trailer will be lifted by the railway truck and supported thereon with its wheels out of engagement with their supports, said coupler including an upstanding pin on the railway truck and a bar hingedly attached to the trailer for vertical movement and having an aperture arranged to receive said pin.

2. The structure defined in claim 1 which further includes means for holding the coupler bar in an inoperative position.

3. The structure defined in claim 1 in which said bar is constructed and arranged to ride over the pin during travelling movement of the trailer in respect to the railway truck to align the aperture with the pin, whereby the bar will drop by gravity and interlock with the pin.

4. The combination with the two rails of a railway track, of a trailer having front and rear trucks, each of which is mounted for angular steering movements, a track section for the trailer at an elevation above the railway track and including a pair of guide rails for the wheels of the trailer, said guide rails being of a wider gauge than the rails of the railway track and located one on each side thereof, the guide rails at one end thereof being in converging relation to the rails of the railway track, a pair of railway trucks arranged to run on the rails of the railway track and be positioned under the trailer when on the track section, each truck of the trailer having a lock for holding the same against pivotal movement, and a drawbar on each truck for attaching the same to a tractor.

5. The combination with the two rails of a railway track, of a trailer truck, a track section for the trailer truck at an elevation above the railway track and including a pair of guide rails for the wheels of the trailer, said guide rails being of a wider gauge than the rails of the railway track and located one on each side thereof, the guide rails at one end of the track section being in converging relation with the rails of the railway track, a railway truck arranged to run on the rails of the railway track, said guide rails being arranged to support the trailer for movement over the railway truck when under the track section, and an automatic coupler for connecting the railway truck to the trailer when said trailer is over the railway truck during relative movement of the trailer on the guide rails and causing the railway truck to move therewith, whereby when the trailer and railway truck are moving on the converging portions of the two tracks, the trailer will be lifted by the railway truck and supported thereon with its wheels out of engagement with their supports, the wheels of the trailer truck being in dual arrangement and the side frames of the railway truck being constructed and arranged to enter between the wheels of each pair and engage the connecting parts therebetween and support the trailer therefrom.

6. The combination with a railway track, of a pair of trucks having wheels arranged to run on the railway track, a highway and railway vehicle having land wheels, a tractor, means for coupling the tractor to the vehicle whereby the same may be drawn by the tractor on a highway, means for transferring the vehicle from the highway directly onto the trucks and into a position in which it is entirely supported on the tracks and in which position it forms a connection between the trucks, said transferring means also being arranged to transfer the vehicle from the trucks onto its land wheels on the highway, and means for coupling the vehicle to and between cars on the railway track, whereby said vehicle will form a section of a train of cars.

7. The structure defined in claim 6 in which the transfer of the vehicle from the highway to the trucks is performed by the tractor during the travel thereof.

8. The combination with a railway track, of a pair of trucks having wheels arranged to run on the railway track, a highway and railway vehicle having land wheels, a tractor, means for coupling the tractor to the vehicle whereby the same may be drawn by the tractor on a highway, means for transferring the vehicle from the highway directly onto the trucks by the tractor during the travel thereof and into a position in which it is entirely supported on the tracks and in which position it forms a connection between the trucks, said transferring means also being arranged to transfer the vehicle from the trucks onto its land wheels on the highway, means for automatically coupling the vehicle to the trucks during its transfer onto the trucks and for automatically uncoupling the vehicle from the trucks during its transfer therefrom onto its land wheels on the highway, and means for coupling the vehicle to and between cars on the railway track, whereby said vehicle will form a section of a train of cars.

9. The combination with a railway track, of a track section above the railway track and extending in the same direction, a pair of trucks on the railway track under the track section, a highway and railway vehicle having land wheels, a tractor, means for coupling the tractor to the vehicle whereby the same may be drawn by the tractor on a highway or on the track section, said track section being arranged to lower the vehicle directly onto the trucks while being drawn by the tractor on the track section in one direction and to lift the vehicle from the trucks when moved in a reverse direction, and means for automatically coupling the vehicle to the trucks during the lowering of the vehicle on the trucks and for uncoupling the vehicle from the trucks during the raising of the vehicle from the trucks, and means for coupling the vehicle to and between cars on the railway track, whereby said vehicle will form a section of a train of cars.

FRANK FERRIN.